United States Patent [19]
Yamauchi

[11] 3,911,596
[45] Oct. 14, 1975

[54] INDIVIDUAL ANSWERER ANSWERING TIME INTERVAL RECORDING SYSTEM FOR A TEACHING MACHINE

[75] Inventor: Satoshi Yamauchi, Tokyo, Japan
[73] Assignee: Ricoh Co., Ltd., Tokyo, Japan
[22] Filed: Jan. 4, 1974
[21] Appl. No.: 430,942

[30] Foreign Application Priority Data
Jan. 11, 1973   Japan.................................. 48-6124

[52] U.S. Cl...................... 35/8 R; 35/9 R; 35/48 R
[51] Int. Cl.²............................................ G09B 7/00
[58] Field of Search.............. 35/8 R, 8 A, 9 R, 9 A, 35/9 B, 22, 48 R, 48 B; 235/184; 340/324 R

[56] References Cited
UNITED STATES PATENTS

| | | | |
|---|---|---|---|
| 3,300,877 | 1/1967 | Feder................................... | 35/9 A |
| 3,501,851 | 3/1970 | Price et al............................. | 35/9 A |
| 3,647,926 | 3/1972 | Rohloff et al........................ | 35/48 R |
| 3,818,483 | 6/1974 | Yamauchi et al............... | 35/48 R X |

Primary Examiner—Robert W. Michell
Assistant Examiner—Vance Y. Hum
Attorney, Agent, or Firm—Cooper, Dunham, Clark, Griffin & Moran

[57] ABSTRACT

An individual answerer answering time interval recording system for a group response device utilized, for instance, in a teaching machine for a large number of pupils, wherein the time interval from the instant a question is given to a number of pupils to the instant a selected percentage of the pupils answer the question is measured, timing pulses based on the said time interval and having a recurrence period in proportion thereto are produced and are counted successively, and each time a new answer occurs, the counted number of the said pulses is stored in a memory zone of a buffer memory for said answerer. Thus, the system records the answer time of each pupil in terms of the percentile group of its occurrence, rather than in terms of fixed units of time, e.g. pupil A answered question 1 within the time of the first 5% of all answers, student B answered the question within the time of the last 5% of all answers, etc.

4 Claims, 6 Drawing Figures

INDIVIDUAL ANSWERER ANSWERING TIME INTERVAL RECORDING SYSTEM FOR A TEACHING MACHINE

BACKGROUND AND SUMMARY OF THE INVENTION

This invention relates to an answering time interval memory system, and more particularly to an individual answerer answering time interval recording system for a group response device used, for instance, in teaching machines for a large number of pupils.

Recently, teaching machine systems for use by a large number of pupils have been adopted. In these teaching machines, the time interval from the instant a question is given to the pupils to the instant the answer is obtained (answering time interval) is converted to a digital code and is stored on a recording medium such as magnetic tape, paper tape or the like. Subsequently, the recorded data is read out for various types of totalling, analysis, etc. In this connection, the time interval from the instant a question is given to pupils to the instant the answer is obtained is not constant but varies substantially with the degree of difficulty of the question, the knowledge of the pupils, etc. And, if this substantially varying time interval is converted directly to a digital code, the corresponding number of bits may on occasion be very large, not only causing the required recording space of the recording medium to be increased but also making subsequent data handling extremely complicated. To solve this problem, it is possible to neglect answering time intervals which exceed a certain limit. However, with this method, it is impossible to ensure correct control over the learning process.

The object of this invention is to provide an individual answerer answering time interval recording system for a group response device which permits recording of the answering time interval of each pupil, which interval may vary substantially with the degree of difficulty of the question or the background of the pupil, on a recording medium without excessively increasing the number of bits required.

In more detail, an object of this invention is to provide an individual answerer answering time interval recording system for a group response device such that the answering time interval of each pupil is stored in a buffer register, the form of a time factor based on a time scale tht varies in accordance with the distribution of all answer times to a question. Subsequently, the stored data is read out and recorded on a recording medium such as magnetic tape, paper tape or the like.

According to one embodiment of this invention, the time interval $\tau$ from the instant a question is given to a number of pupils to the instant the percentage answering reaches, for instance, 5% is digitally measured and set in a register. The content of the register is compared with the content of a first counter which is advanced with clock pulses having a definite recurrence period, and if coincidence exists a timing pulse is sent out. At the same time, the content of the said first counter is cleared, and subsequently, again it is advanced with the clock pulse. In this way, if the content of the first counter coincides with the content of the said register, again the timing pulse is sent out. Subsequently, the afore-mentioned operation is repeated, and a second counter is advanced with the said timing pulse. Additionally, a buffer memory having a plural number of memory zones each of which corresponds to each pupil by one-to-one correspondence is provided. And, each time a new answer occurs, the counted value of the said second counter at that time is stored in the memory zone corresponding to the answerer in the buffer memory. In short, the counted value of the said second counter represents the time factor of the true answering time interval, and said time factor is stored in place of the true answering time interval in the buffer memory. Subsequently, the content of the buffer memory is recorded on a recording medium such as magnetic tape, paper tape or the like and can be utilized for various further processing. Thus, the time each student takes to answer a question is measured and recorded not as true time, but as time along a normalized time scale.

DESCRIPTION OF PREFERRED EMBODIMENTS

Figure 1:
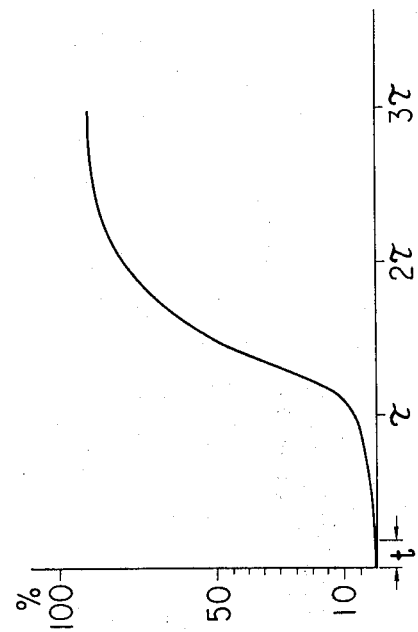
FIG. 1 is a graph which shows a typical distribution of the answer times for a question which is given to a large number of pupils.

Referring to FIG. 1, a graph shows a typical answer rate curve, i.e., a plot of the time from the posing of a question to a number of pupils versus the percentage of the pupils who have answered the question. In the figure, the abscissa shows the time, and the ordinate shows the percentage answering, where the percentage answering is defined as follows.

$$\text{Percentage answering} = \frac{\text{number of answerers}}{\text{number of total pupils}} \times 100 \quad (1)$$

From FIG. 1, it is seen that typically the percentage of pupils who have answered the question is very small, in general, during a certain time interval from the instant the question is given (this time interval is denoted by $\tau$ in the figure), and after the time interval of $\tau$, increases exponentially until settling at a predetermined value after a time interval, for instance, of $3\tau$. The time interval of $\tau$ largely varies with the degree of the difficulty of the question or knowledge of the pupil. Likewise, the slope of the curve after the time interval of $\tau$ is closely related to $\tau$. That is, if $\tau$ is large, the curve is flat, while if $\tau$ is small, the curve is steep. In the following, the time interval of $\tau$ will be assumed to be the time interval within which 5% of the students answer the question, although it is of course not necessary that the value should be 5%. In FIG. 1, a unit time interval of $t$ which shows one scale division of the time axis is defined based on the time interval of $\tau$ assumed above (i.e. $t$ is a defined submultiple of $\tau$). It is easy to understand that the unit time interval of $t$ varies with $\tau$. The answering time interval of a pupil can be denoted by $$T = a\tau \quad (2)$$

where $a$ is the time factor defining the answer time of that student on a normalized time scale. According to this invention, this time factor $a$ of each pupil is obtained based on the said time interval of $\tau$ and it is utilized in place of the actual answering time interval.

Figure 2:
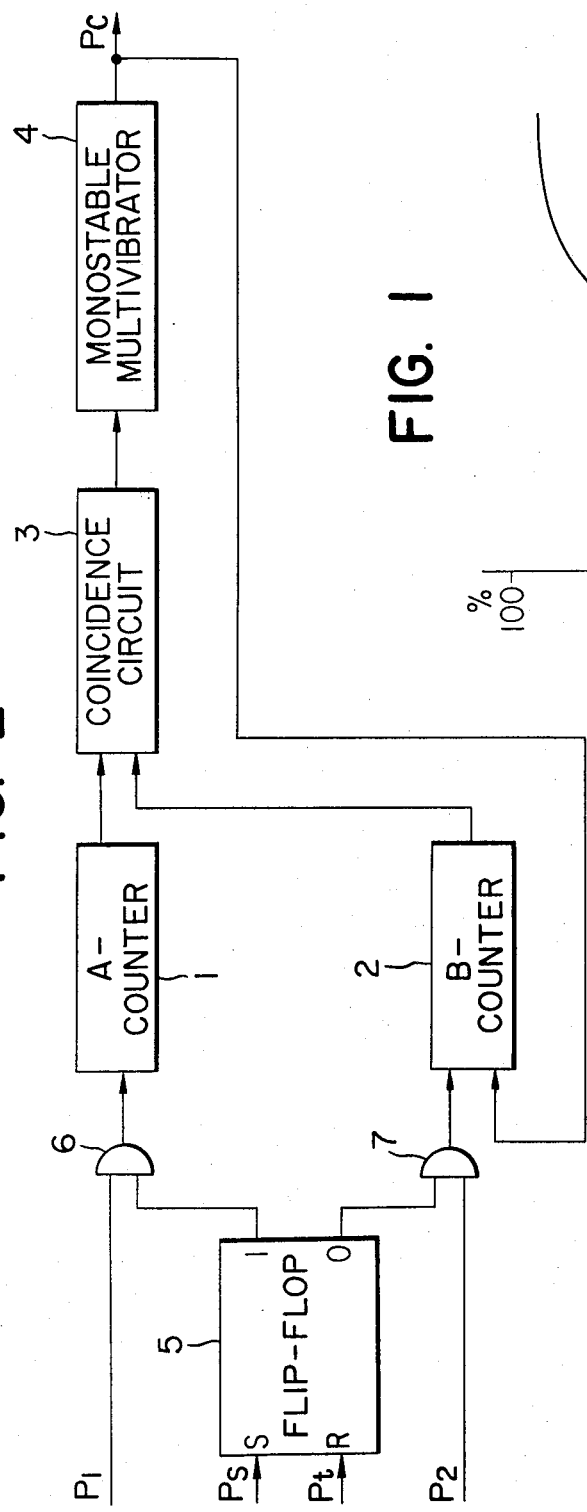
FIG. 2 shows an example of a prior art circuit for generating a time scale signal which reflects the distribution of answer times.

FIG. 2 shows a prior art (see U.S. Pat. No. 3,818,483) circuit for generating timing pulses having a recurrence period corresponding to the unit time interval of $t$ mentioned above. Referring to FIG. 2, A-counter 1 is a binary counter to count a first pulse train $P_1$. B-counter 2 is another binary counter to count a second pulse train $P_2$. Start signal $P_s$ takes a high level at the instant a question is given to the pupils. Stop signal $P_t$ takes a high level at the instant the percentage of the pupils that have answered the question reaches 5%. That is, the time interval from the instant the start signal $P_s$ takes the high level to the instant the stop signal $P_t$ takes the high level corresponds to the time interval of $\tau$ described with reference to FIG. 1. When the start signal $P_s$ takes the high level, flip-flop 5 is set. The set output of flip-flop 5 is supplied to AND gate 6. Therefore, when the flip-flop 5 is set, the first pulse train $P_1$ is passed through AND gate 6 to the A-counter 1 where it is counted. Subsequently, the pupils start to answer, and when the percentage answering reaches 5%, the flip-flop 5 is reset with the stop signal $P_t$. Then, the A-counter 1 stops counting and contains a value corresponding to the time interval of $\tau$.

The reset output of the flip-flop 5 is supplied to AND gate 7. When the flip-flop 5 is reset, the second pulse train $P_2$ is passed through the AND gate 7 to the B-counter 2 where it is counted. When the counted value of the B-counter 2 coincides with the content of the A-counter 1, coicidence circuit 3 sends a coincidence output and this output drives mono-stable multivibrator 4. $P_c$ is the output pulse from the mono-stable multivibrator. The B-counter 2 is cleared by the pulse $P_c$. Subsequently, when the pulse $P_c$ disappears, the B-counter 2 starts counting again and its content is compared with the content of the A-counter 1. Subsequently, the operation mentioned above is repeated to send out the pulse $P_c$ having a predetermined recurrence period successively from the monostable multivibrator 4.

Now, let the recurrence periods of the first pulse train $P_1$ and second pulse train $P_2$ be $T_1$ and $T_2$, respectively, and assume the following relation between them.

$$T_1 = n \cdot T_2 \qquad (3)$$

where $n$ is an integer. Let the counted value of the A-counter 1 be $n_1$, then the time interval of $\tau$ is $$\tau = n_1 \cdot T_1 \qquad (4)$$

Substituting Eq. (3) in Eq. (4) gives $$\tau = n_1 \cdot n \cdot T_2 \qquad (5)$$

Further, if we let the counted value of the B-counter 2 be $n_2$, then the period $T_c$ of pulse $P_c$ is given by the following formula.

$$T_c = n_2 \cdot T_2 \qquad (6)$$

Therefore, from Eq. (5) and Eq. (6), $$\tau = \frac{n_1}{n_2} n T_c \qquad (7)$$

When the counted values of both counters 1 and 2 coincide with each other, $n_1 = n_2$ and Eq. (7) becomes as follows.

$$\tau = n \cdot T_c \qquad (8)$$

Eq. (8) means that the recurrence period of pulse $P_c$ varies with $\tau$. As a result, by scaling of the time axis with the pulse $P_c$, it is possible to display or record a curve as shown in FIG. 1 in a definite space irrespective of the length of the response time. Such a system has already been proposed by the inventor of this invention. For the details of this system, refer to U.S. Pat. No. 3,818,483 issued on June 18, 1974.

Figure 3:
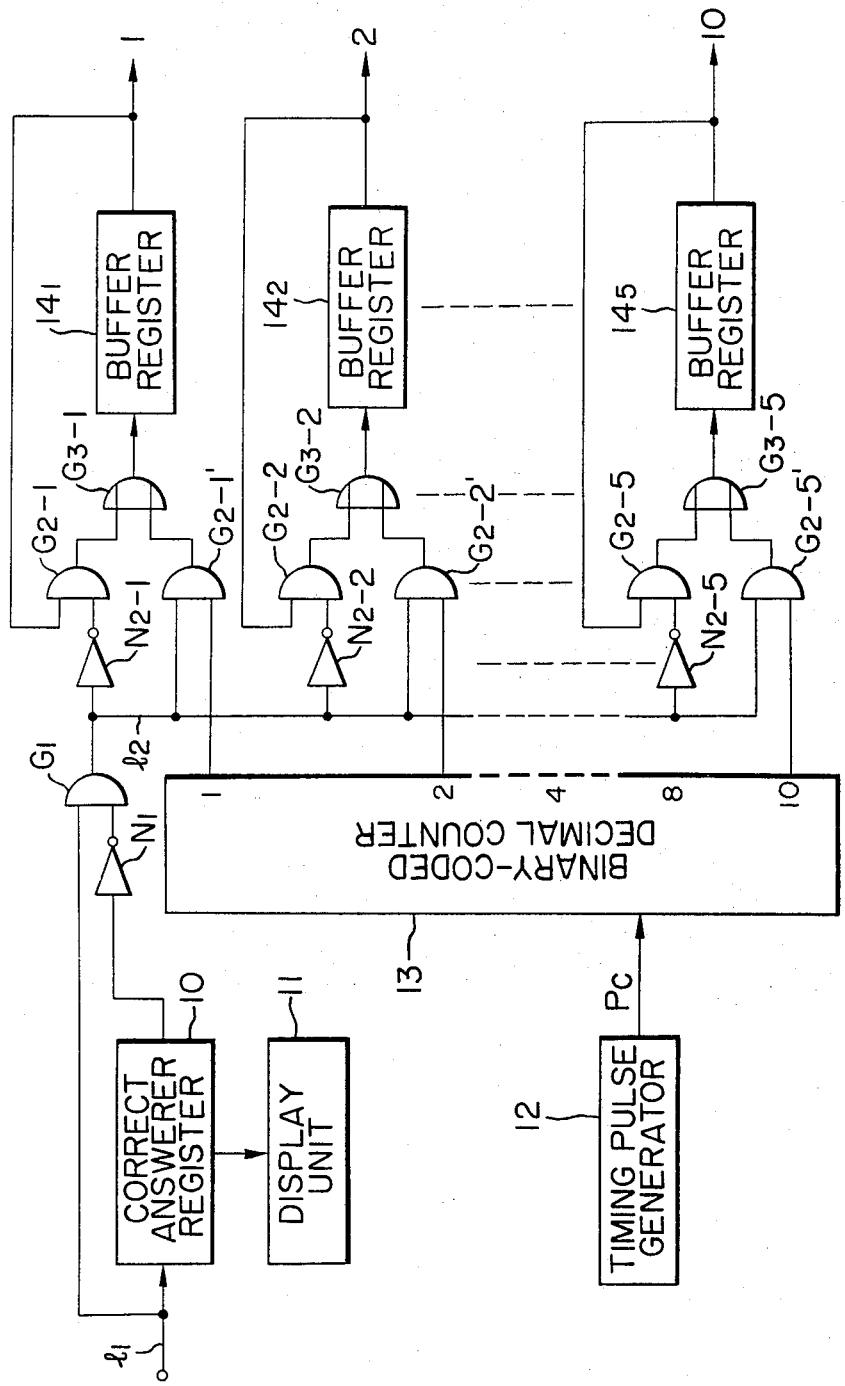
FIG. 3 shows an embodiment of the individual answerer answering time interval recording system according to this invention.

FIG. 3 shows a block diagram for an embodiment of this invention. Referring to FIG. 3, correct answerer register 10 is a shift register having the capacity of series bits of the number equal to the number of pupils questioned. Each bit position in this shift register is allocated for each pupil. In the group response device in which the correct answerer register is adopted, a group of slave units arranged at the pupil stations is scanned at a fast speed by means of clock pulses having a suitable recurrence period and at the same time, the correct answerer register is shifted in synchronism with the same clock pulse. Each correct answer or wrong answer of each pupil found by the scanning of each slave unit is set as "1" or "0" respectively at each bit position allocated for each pupil in the correct answerer register. Such a group response device has already been proposed by the inventor of this invention. For the details, refer to U.S. Pat. application No. 291,620 filed on Sept. 25, 1972. The "1" or "0" state set in the correct answerer register 10 is displayed on a display unit 11 having display elements corresponding to bit positions of the register 10. Block 12 is a time axis timing pulse generator constructed as shown in FIG. 2. Block 13 is a binary-coded decimal counter (time scale counter) to count the timing pulse $P_c$ sent from the pulse generator 12. It is easy to understand that the counted value of counter 13 shows the time factor $a$ based on the time interval of $\tau$ described with reference to FIG. 1. Take for example the case where, as shown, the counter 13 is of 5-bit configuration and its bit positions are decimal weighted "1", "2", "4", "8" and "10". Blocks $14_1 - 14_5$ are a group of buffer registers comprising shift registers of the number equal to the number of bits of the counter 13. Each buffer register has the same bit capacity as the correct answerer register 10 and its each bit position is allocated for each pupil by one-to-one correspondence as in the correct answerer register 10. The group of buffer registers $14_1 - 14_5$ is shifted in synchronism with the clock pulse (not shown) given to the correct answerer register 10.

Normally, gates $G_2\text{-}1 - G_2\text{-}5$ are in the on-state and gates $G_2\text{-}1' - G_2\text{-}5'$ are in the off-state. In this condition, the content of each of buffer registers $14_1 - 14_5$ is simply re-circulating in synchronism with the clock pulse. During this period, each time each slave unit arranged at each pupil station is scanned, the answering condition of each pupil at that time is supplied as a series pulse train of "1" and "0" through input line $l_1$ to the correct answerer register 10 to renew the content of the register 10.

Take for example the case where the first pupil makes a correct answer and the bit corresponding to the first pupil in the pulse train given through the input line $l_1$ to the register 10 is changed from "0" to "1". When the "1" signal showing the correct answering of the first pupil is applied on the input line $l_1$, the "0" signal for the same first pupil already set in the correct answerer register 10 is given to inversion circuit $N_1$ in synchronism therewith. Then the gate $G_1$ is turned on by the "1" signal from the input line $l_1$ and inversion circuit $N_1$, so that "1" signal is given on the line $l_2$. As the result, gates $G_2$-1 – $G_2$-5 are turned off and gates $G_2$-1' – $G_2$-5' are turned on so that the buffer registers $14_1$ – $14_5$ stop re-circulation for one clock pulse and the counted value of the counter 13 is stored in parallel at the bit positions corresponding to the first pupil in buffer registers $14_1$ – $14_5$. That is, the counted value of the counter 13 showing the time factor a of the first pupil is stored at the positions corresponding to that first pupil in the buffer register $14_1$ – $14_5$. Similarly, when any pupil gives makes a correct answer, then lines $l_1$ and $l_2$ are turned to "1" at the scanning time corresponding to the pupil and the counted value of the counter 13 is stored at the bit positions corresponding to the pupil in the buffer registers $14_1$ – $14_5$. Subsequently, each time the pulse train of "1" and "0" showing the correct answering-wrong answering condition of each pupil is given on the input line $l_1$, the operation mentioned above is repeated so that at each bit position in the buffer registers $14_1$ – $14_5$ the time interval (accurately the time factor $a$ of the time interval of $\tau$) required for the pupil corresponding to the said position to make a correct answer is stored as the counted value of the counter 13. Of course, bit positions corresponding to those pupils who make no answer and wrong answer are kept in the "0" state. The content of the buffer registers $14_1$ – $14_5$ is subsequently read out in parallel and is recorded on a recording medium such as magnetic tape, punch tape or the like (not shown). If at the same time a value showing, for instance, the time interval of $\tau$ is recorded on the recording medium, it will be convenient for later calculating the true response time of each pupil. For this value of $\tau$, the content of the counter 1 shown in FIG. 2 may be used. That is, since the counted value of the counter 1 represents the value of $\tau$, it may be recorded on the recording medium.

In the circuit configuration shown in FIG. 3, an inconvenience will occur as follows. If a pupil, once making a correct answer, makes a wrong answer by re-depressing an answer button (not shown) on the slave unit at the pupil station, the response time interval which is at that time stored for the previous correct answer in the buffer registors $14_1$ – $14_5$. This inconvenience can be eliminated by changing the circuit configuration to that shown in FIG. 4.

Figure 4:
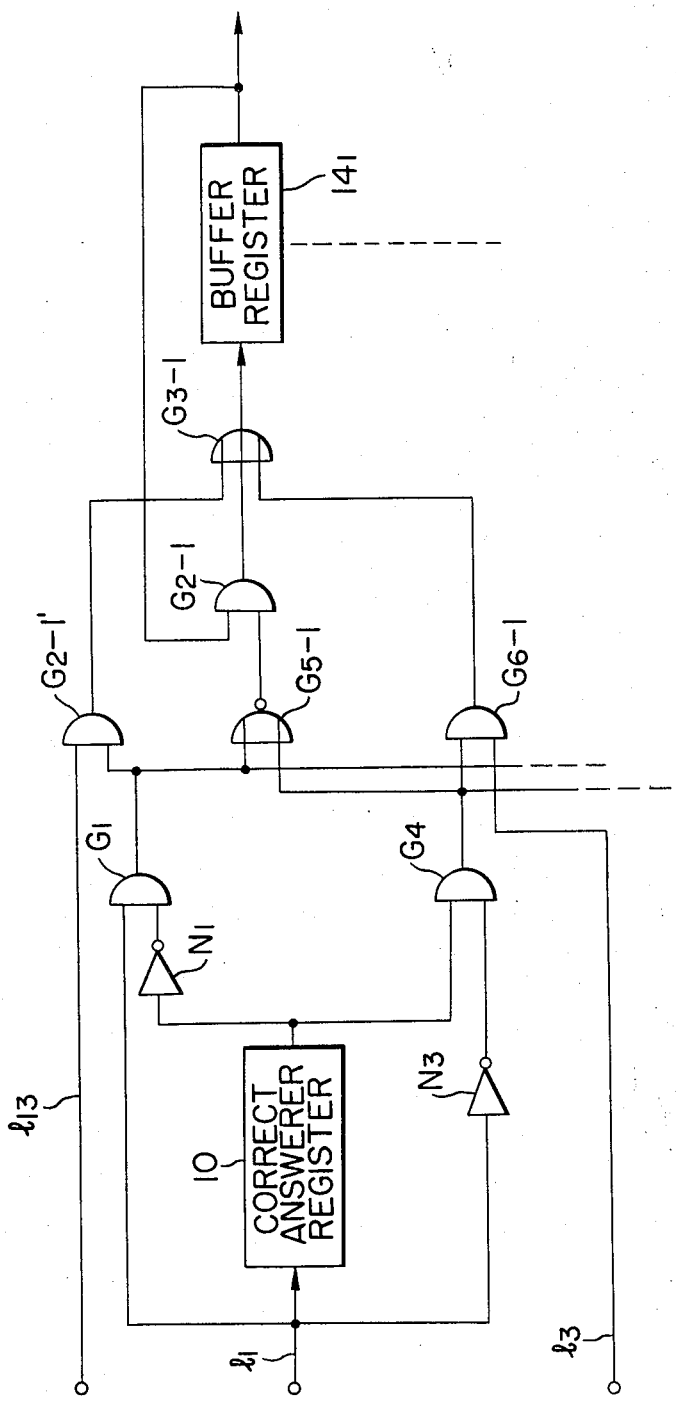
FIG. 4 shows a modification of the system of FIG. 3.

Referring to FIG. 4, where those parts identical to FIG. 3 are shown by identical symbols, and only one of the buffer registers $14_1$ – $14_5$, that is, register $14_1$ is shown, the operation of this circuit is as follows. If a pupil, once making a correct answer, makes a wrong answer by re-depressing an answer button, then "0" signal appears on the input line $l_1$, and as the result, AND gates $G_1$, $G_2$-1 and $G_2$-1' are turned off so that the buffer register $14_1$ stops circulation of its content. Then, because the signal on the line $l_1$ is "0" and the output of the correct answerer register 10 is "1", AND gate $G_4$ is turned on. Therefore, if, for instance, on the line $l_3$ a specific code signal showing non-correct answering has been given, the said code signal is passed through AND gate $G_6$-1 and ON gate $G_3$-1 and is stored at the bit position corresponding to the pupil who made the said wrong answer in the buffer register $14_1$. The line $l_{13}$ is the output line for the first bit of the counter 13 shown in FIG. 3.

Figure 5:
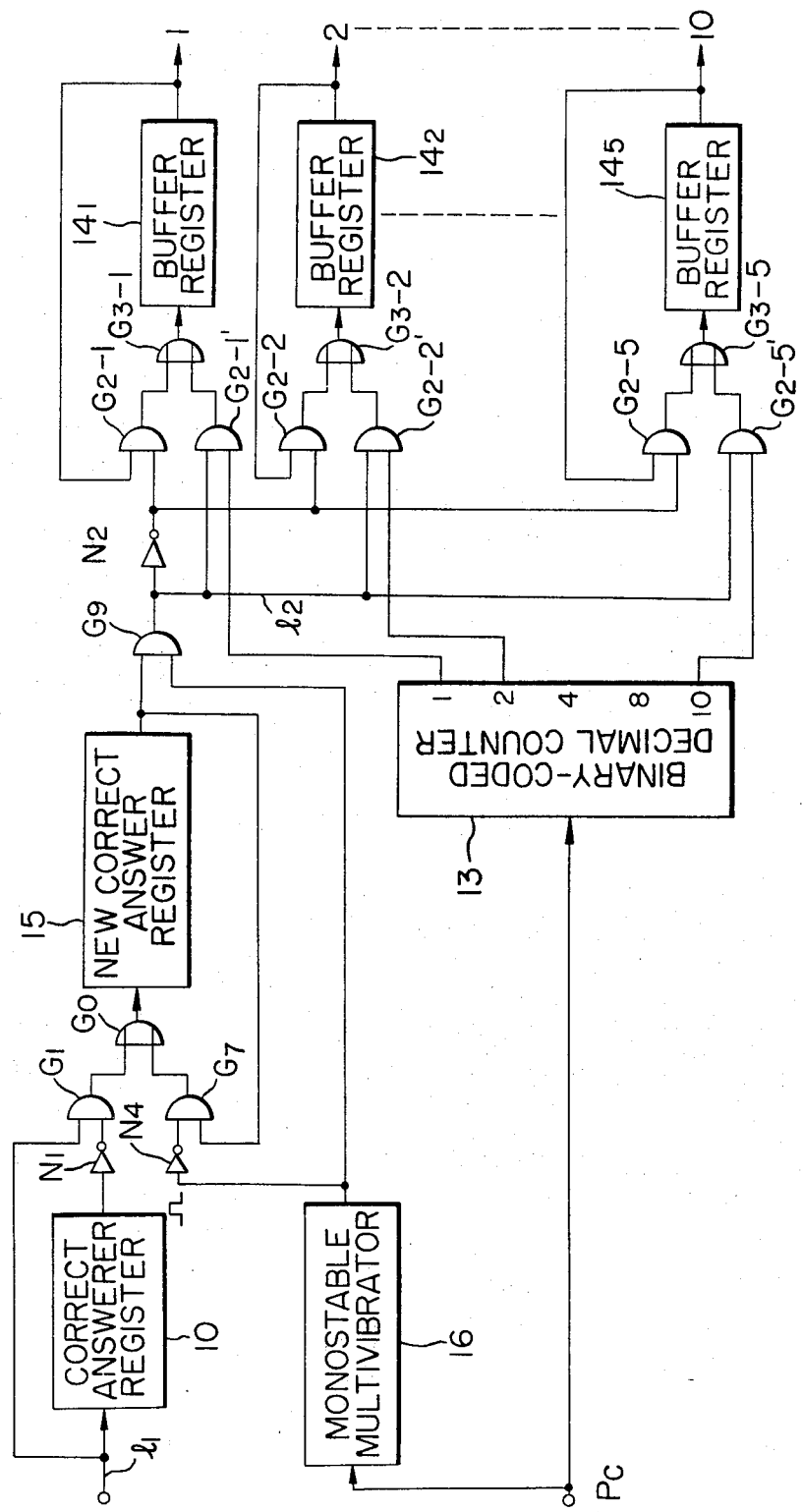
FIG. 5 shows another embodiment of a system according to this invention.

In the circuit configuration shown in FIG. 3, each time a new answerer provides a correct answer, the counted value of the time factor counter 13 at that time is stored at the bit positions corresponding to the said correct answerer in the buffer registers. The storing of said counted value in the buffer registers in this may be done each time the timing pulse $P_c$ which advances the time factor counter is generated. The circuit configuration to this end is shown in FIG. 5. It differs from FIG. 3 in that between the correct answerer 10 and the buffer registers $14_1$ – $14_5$ a new correct answerer is register 15 having the same bit capacity and the content of the said register 15 is outputed as the new correct answerer information only when the monostable multivibrator 16 driven by the timing pulse $P_c$ operates.

Figure 6:
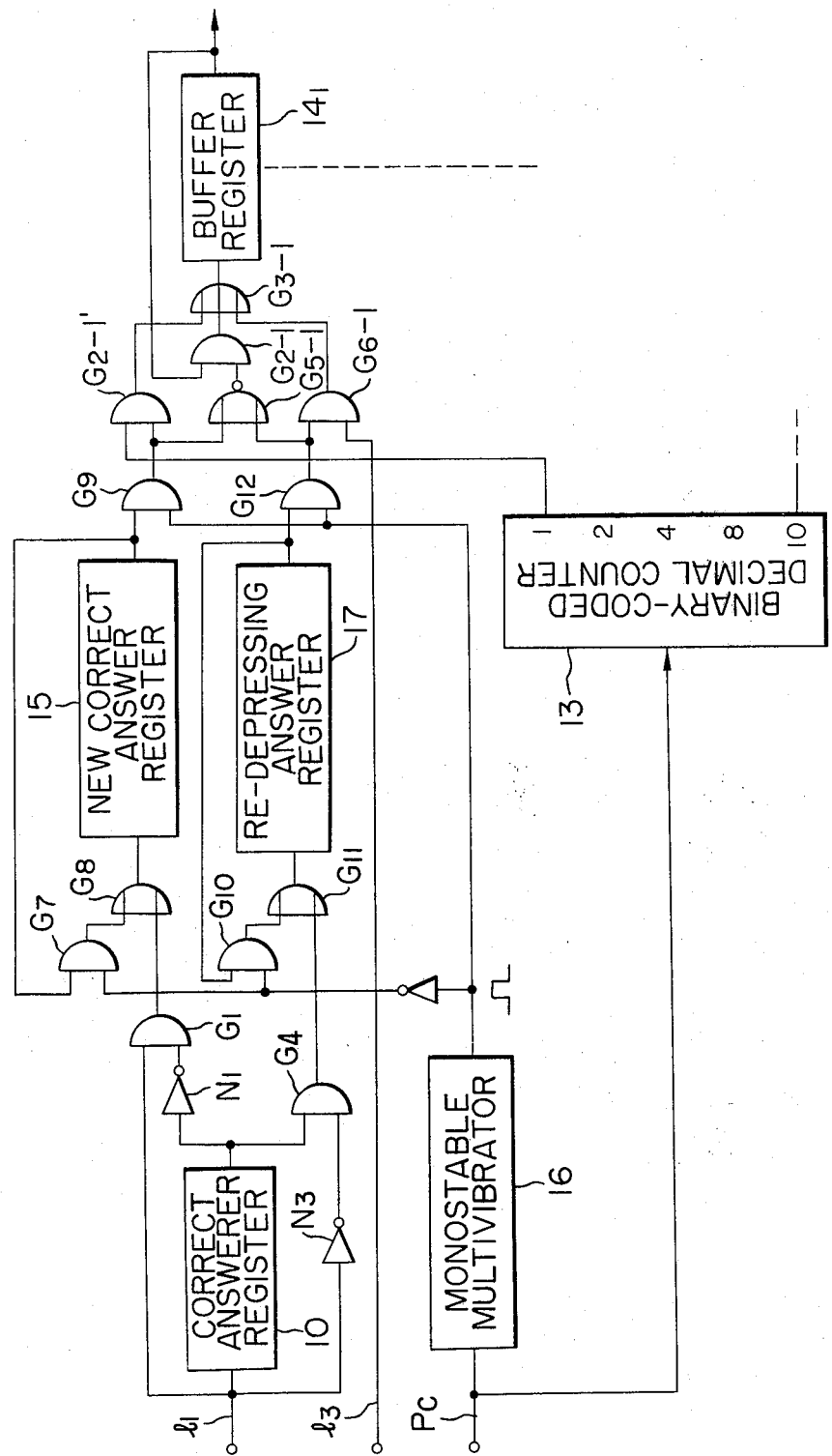
FIG. 6 is a modification of the system of FIG. 5.

In the steady state, AND gates $G_7$ and $G_2$-1 – $G_2$-5 are in the on-state and AND gates $G_9$ and $G_2$-1' – $G_2$-5' are in the off-state so that the contents of the new correct answerer register 15 and buffer registers $14_1$ – $14_5$ are merely circulating. Each time a new correct answerer is entered through the input line $l_1$ in the correct answerer register 10, AND gate $G_1$ is turned on and the said new correct answerer is entered in the register 15. That is, the bit position corresponding to the pupil who makes a new correct answer in the register 15 is set to "1". Then, upon arrival of the timing pulse $P_c$, the time factor counter 13 is advanced, and at the same time, the monostable multivibrator 16 operates to turn on the AND gate $G_9$ for a time period of one circulating cycle of each register so that the new correct answerer information is outputted successively from the register 15 through the gate 9 to the line $l_2$. As the result, the counted value of the counter 13 is entered at the bit positions corresponding to the new correct answerer in the buffer registers $14_1$ – $14_5$. This operation is the same as in FIG. 3. During this period, the AND gate $G_7$ is in the off-state so that the new correct answerer register 15 stops circulation and the content is cleared. Subsequently, each time the timing pulse $P_c$ is generated, the operation mentioned above is repeated and the counted value of the counter 13 at that time is entered at the predetermined positions in the buffer registers $14_1$ – $14_5$. In this circuit configuration, the function to invert the new correct answerer information on the line $l_2$ is accomplished by a single inversion circuit $N_2$, but, of course, it is possible to provide a separate invertor for each buffer register as shown in FIG. 3. Even if a new correct answer occurs during the period for which the monostable multivibrator 16 is in operation, there is no inconvenience because it is passed through gates $G_1$ and $G_8$ and entered in the new correct answerer register 15. FIG. 6 shows a re-depressing answerer register 17 having the same bit capacity as the new correct answerer register 15 so that the circuit configuration of FIG. 5 has the same function as described in FIG. 4.

The foregoing refers to the embodiments of the invention where the time interval (on a normatized time scale) from the instant a question is given to the instant a correct answer is made by the pupil is recorded. Of course, it is possible to similarly record any answer irrespective of whether it is correct or wrong.

What is claimed is:

1. A teaching system having a plurality of pupil stations, each station having means for providing an answer signal indicating the answer of the pupil to a question posed to the plurality of pupils, said system further having means for determining which answer signals represent correct answers and which represent wrong answers, and comprising:

means for determining a selected percentage of the pupil stations providing a defined answer signal;

means for determining the duration of the time interval from the posing of a question to the pupils until a selected percentage of the pupil stations have provided a defined answer signal;

means for generating a succession of time scale signals at a rate corresponding to the duration of said time interval;

means for counting the number of said time scale signals from a time corresponding to the posing of the question; and means for storing, for each pupil station, an answer time signal representing the number counted by the counting means at a time corresponding to the time the pupil station provides a correct answer signal, thereby providing an indication of the time each pupil has taken to answer the question as related to the time it has taken to receive answers from a selected percentage of the pupils.

2. A teaching system as in claim 1 including means for deleting the stored answer time signal for a pupil station which provides a wrong answer signal subsequent to having provided a correct answer signal.

3. A teaching system as in claim 1 wherein the counting means provides as an output a multibit number representing its contents and wherein the storing means comprises a buffer register for each bit of the counting means output, each register having a bit position corresponding to each pupil, the multibit number at the output of the counting means being stored in the bit positions of said buffer registers corresponding to the pupil station which has provided a correct answer signal.

4. A teaching system as in claim 3 including a correct answer register having a bit position corresponding to each pupil station, the contents of each bit position being changed from one binary state to another when the corresponding pupil station provides a correct answer signal, the storing of the counter means output in the corresponding bit positions of the buffer registers occurring at the time of changing the contents of the corresponding bit position in the correct answer register.

* * * * *